(12) United States Patent
Snyder, Sr. et al.

(10) Patent No.: US 6,499,771 B1
(45) Date of Patent: Dec. 31, 2002

(54) MECHANICAL PIPE COUPLING WITH TOOTHED RETAINER

(75) Inventors: Ronald R. Snyder, Sr., Schnecksville; Charles E. Wilk, Jr., Northampton, both of PA (US); Lawrence W. Thau, Jr., Flemington; Douglas R. Dole, Whitehouse Station, both of NJ (US)

(73) Assignee: Victaulic Company of America, Easton, PA (US)

( * ) Notice: Subject to any disclaimer, the term of this patent is extended or adjusted under 35 U.S.C. 154(b) by 0 days.

(21) Appl. No.: 09/618,611

(22) Filed: Jul. 18, 2000

(51) Int. Cl.[7] .................................................. F16L 19/12

(52) U.S. Cl. ...................................... 285/319; 285/340

(58) Field of Search ................................ 285/104, 105, 285/110, 111, 112, 319, 340; 29/521, 890.145, 890.148, 890.149, 890.15

(56) References Cited

U.S. PATENT DOCUMENTS

| | | | |
|---|---|---|---|
| 922,805 A | * | 5/1909 | Nelson et al. ............ 285/319 X |
| 1,965,273 A | | 7/1934 | Wilson |
| 2,147,353 A | | 2/1939 | Scholtes ..................... 285/84 |
| 2,201,372 A | | 5/1940 | Miller ....................... 285/115 |
| 2,759,254 A | | 8/1956 | Soehnlen et al. ............. 29/428 |
| 3,007,726 A | | 11/1961 | Parkin |
| 3,058,762 A | | 10/1962 | Howe ........................ 285/340 |
| 3,483,789 A | | 12/1969 | Wurzel |
| 3,582,112 A | | 6/1971 | Pico ........................... 285/96 |
| 3,976,314 A | | 8/1976 | Graham ...................... 285/238 |
| 3,995,897 A | * | 12/1976 | Paskert ................... 285/369 X |
| 4,047,743 A | | 9/1977 | Weintraub et al. ........... 285/340 |
| 4,072,328 A | | 2/1978 | Elliott |
| 4,073,514 A | | 2/1978 | Pate |
| 4,146,254 A | | 3/1979 | Turner et al. .............. 285/105 |
| 4,586,734 A | | 5/1986 | Grenier ..................... 285/340 |
| 4,593,943 A | | 6/1986 | Hama et al. ................ 285/308 |
| 4,610,468 A | * | 9/1986 | Wood ..................... 285/319 X |
| 4,635,975 A | | 1/1987 | Campbell ................... 285/340 |
| 4,676,533 A | | 6/1987 | Gerondale |

(List continued on next page.)

FOREIGN PATENT DOCUMENTS

| | | | |
|---|---|---|---|
| DE | 3631-547 | * 4/1988 | ................. 285/340 |
| DE | 297 21 760 | 3/1998 | |
| DE | 297 21 759 | 5/1998 | |
| EP | 0 922 896 | 12/1997 | |
| JP | 9-329284 | * 12/1997 | |

OTHER PUBLICATIONS

U.S. application No. 10/007,951, filed Dec. 3, 2001, entitled "Mechanical Pipe Coupling Derived From a Standard Fitting" (Snyder Sr. et al).

IMI Yorkshire Fittings Group, 4 pages printed from Web Site, namely, Home Page, Tectite, Products and Tectite Installation (downloaded Mar. 15, 2000).

Primary Examiner—Greg Binda
(74) Attorney, Agent, or Firm—Synnestvedt & Lechner LLP

(57) ABSTRACT

An open end of a standard pipe fitting is enlarged in diameter to coaxially receive an O-ring and a retainer having a cylindrical surface. A plurality of locking teeth project from the cylindrical surface and are engageable with both the inner surface of the fitting and an outer surface of a pipe end inserted coaxially into the fitting open end. Each of the locking teeth have oppositely disposed edges facing obliquely inwardly and outwardly to engage both the pipe end and the fitting and resisting motion of the pipe end relatively to the fitting. In an alternate embodiment, a first plurality of teeth each have an edge facing obliquely inwardly of the fitting to engage the pipe end and resist motion tending to withdraw the pipe end from the fitting. A second plurality of teeth each have an edge facing obliquely outwardly of the fitting and resist motion tending to withdraw the retainer from the fitting.

36 Claims, 10 Drawing Sheets

U.S. PATENT DOCUMENTS

| | | | |
|---|---|---|---|
| 4,744,412 A | * 5/1988 | Kim et al. | |
| 4,747,626 A | 5/1988 | Hama et al. | 285/308 |
| 4,842,306 A | 6/1989 | Zeidler et al. | 285/104 |
| 4,911,406 A | 3/1990 | Attwood | |
| 5,029,908 A | * 7/1991 | Belisaire | 285/319 X |
| 5,039,141 A | * 8/1991 | Badoureaux | 285/340 |
| 5,160,179 A | 11/1992 | Takagi | 285/340 |
| 5,295,697 A | 3/1994 | Weber et al. | |
| 5,603,530 A | 2/1997 | Guest | 285/105 |
| 5,695,224 A | 12/1997 | Grenier | 285/104 |
| 5,816,627 A | 10/1998 | Readman | 285/340 |
| 5,857,718 A | * 1/1999 | Kleinschmidt | 285/319 X |
| 5,988,705 A | * 11/1999 | Norkey | 285/319 |
| 6,058,755 A | * 5/2000 | Viegener | |
| 6,186,561 B1 | * 2/2001 | Kaishio et al. | 285/319 |

\* cited by examiner

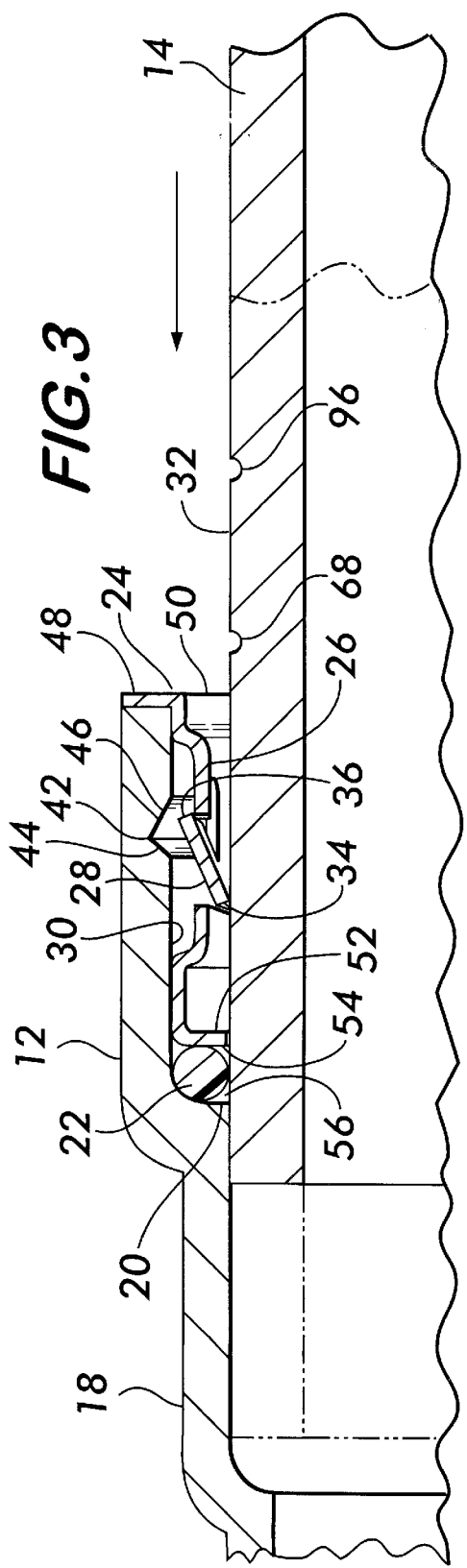
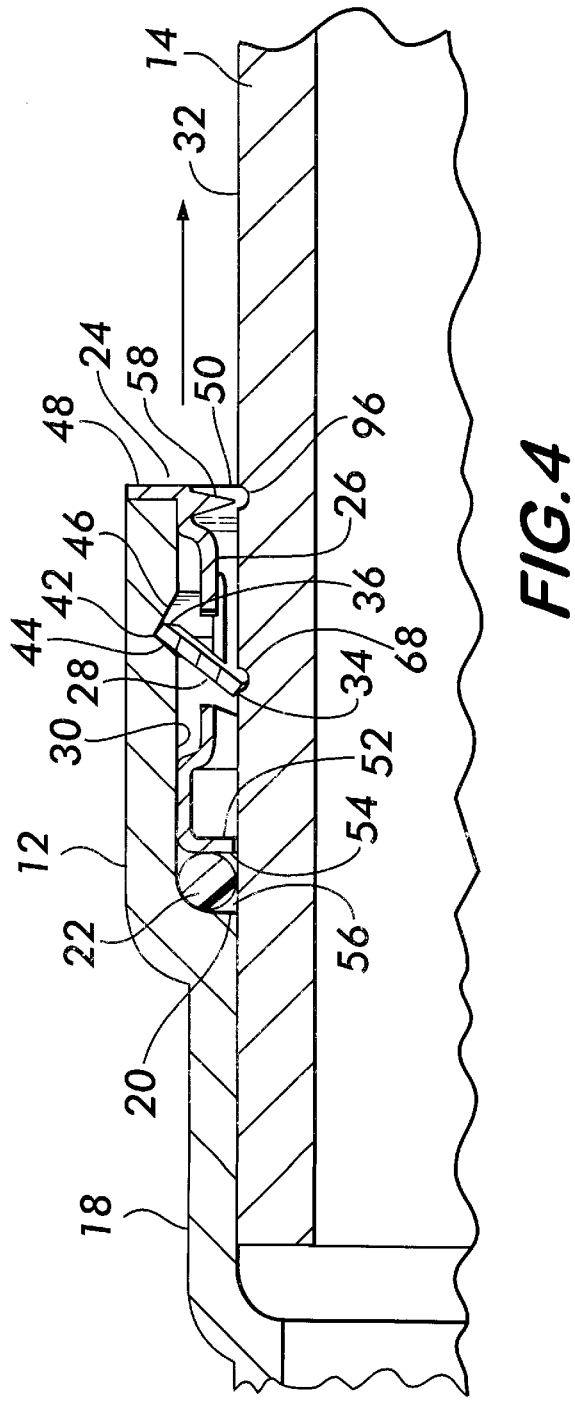

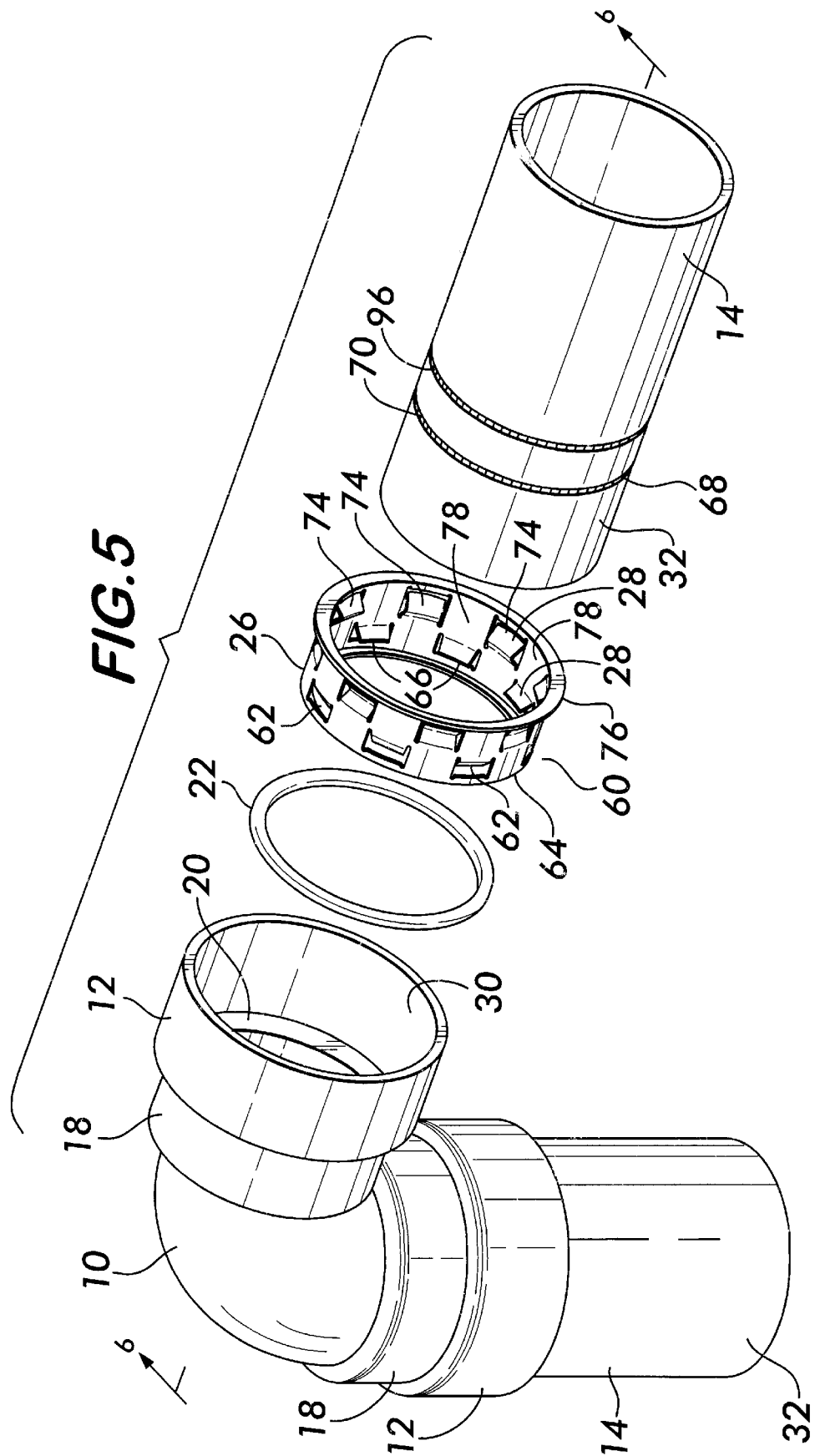

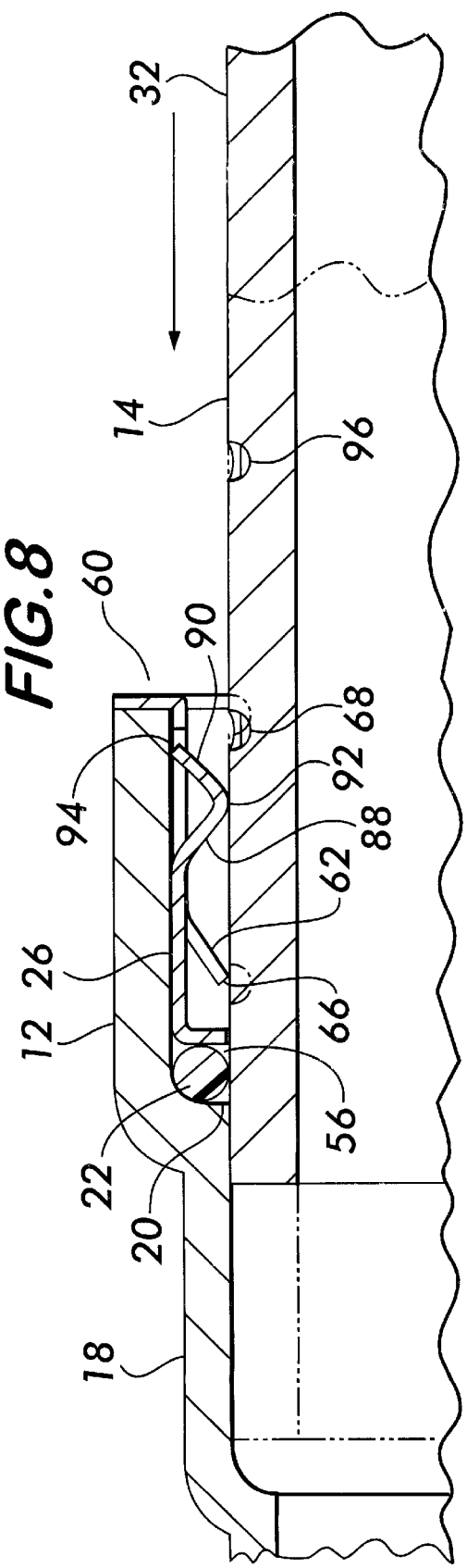
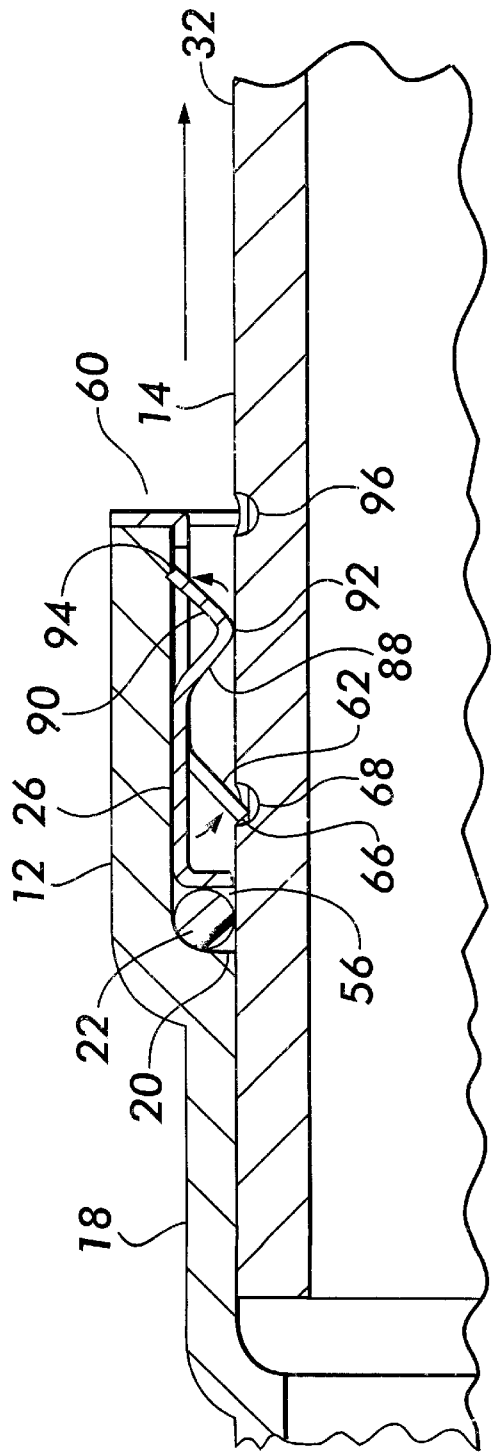

MECHANICAL PIPE COUPLING WITH TOOTHED RETAINER

FIELD OF THE INVENTION

This invention relates to couplings for pipes and especially to couplings which effect a strong, reliable joint with a fluid-tight seal without the need for brazing or soldering.

BACKGROUND OF THE INVENTION

The construction of piping networks requires couplings that can form fluid-tight joints between pipe ends which can withstand external mechanical forces, as well as internal fluid pressure and reliably maintain the integrity of the joint. Many forms of joints are known, such as brazed or soldered joints, threaded joints, welded joints and joints effected by mechanical means.

For example, copper tubing, which is used extensively throughout the world to provide water service in homes, businesses and industry, is typically joined by means of couplings which are soldered to the pipe ends to effect a connection.

The use of copper tubing for piping networks is so widespread that standard tubing sizes have been established in various countries. For example, in the U.S., there is the ASTM Standard entitled "Specification B88-99e1 Standard Specification for Seamless Copper Water Tube" copyright 2001, in Germany, the DIN Standard and in the United Kingdom, the British Standard (BS) both of which are defined by the European Standard EN 1057, dated April, 1996 and entitled "Copper and Copper Alloys—Seamless, Round Copper Tubes For Water and Gas in Sanitary and Heating Applications". Chart 1 below shows a portion of the range of outer diameters of the various standard copper tubes listed above.

CHART 1

Standard Outer Copper Tube Outer Diameters

| ASTM | DIN | BS |
|---|---|---|
| ½" | 15 mm | 15 mm |
| ¾" | 22 mm | 22 mm |
| 1" | 28 mm | 28 mm |
| 1.25" | 35 mm | 35 mm |
| 1.5" | 42 mm | 42 mm |
| 2" | 54 mm | 54 mm |

Naturally, there are standard pipe fittings such as elbows (45° and 90°), tees and straight segments matched for use with the standard tube diameters. These standard fittings are defined in the U.S. by ASME/Standard B16.22a-1998, Addenda to ASME B16.22-1995, entitled "Wrought Copper and Copper Alloy Solder Joint Pressure Fittings", dated 1998. In Europe, the standard fittings are defined by EN 1254, dated Jul. 15, 1998 and entitled "Copper and Copper Alloys—Plumbing Fittings—Part 1 Fittings With Ends for Capilary Soldering or Capilary Brazing to Copper Tubes". The standard fittings have open ends with inner diameters sized to accept the outer diameter of a particular standard tube in mating contact for effecting a soldered joint.

In addition to the standard fittings described above, other components, such as valves, strainers, adapters, flow measurement devices, and other components which may be found in a pipe network will have a coupling which is compatible with the standard pipe, and it is understood that the term "coupling", when used herein, is not limited to a standard elbow, tee, or other fitting but includes the open end of any component useable in a piping network which serves to couple the component to the pipe end.

A soldered joint is effected between a standard diameter tube end and its associated standard fitting by first cleaning the surfaces to be joined, typically with an abrasive such as a wire brush or steel wool, to remove any contaminants and the oxide layer which forms on the surfaces. Next, the cleaned surfaces are coated with a flux material, usually an acid flux, which further disrupts the oxide layer (when heated) and permits metal to metal contact between the fitting, the pipe end and the solder. The pipe end is next mated with the fitting thereby bringing the cleaned, flux coated surfaces into contact. The fitting and pipe end are then heated to the melting temperature of the solder, and the solder is applied to the interface between the tube and the fitting. The solder melts, flows between the surfaces of the pipe end and the fitting via capillary action and forms the solder joint.

While the soldered joint provides a strong, fluid-tight connection between pipe end and fitting, it has several disadvantages. Many steps are required to make the soldered joint, thus, it is a time consuming and labor intensive operation. Some skill is required to obtain a quality, fluid-tight joint. Furthermore, the solder often contains lead, and the flux, when heated, can give off noxious fumes, thus, exposing the worker to hazardous substances which can adversely affect health over time. The joint is typically heated with an open gas flame which can pose a fire hazard.

To overcome these disadvantages, many attempts have been made to create mechanical couplings which do not require solder or flame to effect a strong, fluid-tight joint. Such mechanical couplings often use an over-sized opening accommodating an O-ring for sealing purposes and an annular ring interposed between the outer diameter of the pipe end and the inner diameter of the coupling to mechanically hold the parts together. The annular ring often has radially extending teeth which dig into the facing surfaces of the coupling and the pipe end to resist extraction of the pipe end from the coupling after engagement.

While these mechanical couplings avoid the above identified problems associated with soldered joints, they can suffer from one or more of the following disadvantages. The annular ring may not provide adequate pull-out strength, and the pipe end could be inadvertently separated from the coupling, for example, during thermal contraction of a long run made of several segments of mechanically coupled pipes. If both ends of the pipe run are fixed the thermal contraction will put significant tension loads on each joint, tending to pull them apart. If the pipes carry water and the water in the pipe freezes, the expansion of the water upon freezing will also put significant tensile load on the mechanical joints. Pressure spikes within the pipe, caused by a sudden closing of a valve (the "water hammer effect") also place the joints under tension, and could lead to a joint failure.

The annular ring also does not help keep the pipe end concentric with the coupling upon insertion, allowing the pipe end to tip and deform the annular ring and gouge the inside surface of the coupling or an elastomeric seal, such as an O-ring. The annular ring cannot be relied upon to provide electrical continuity between the pipe end and the coupling, sometimes resulting in a relatively poor ground for electrical purposes. In such a joint, there is furthermore little or no resistance to axial rotation of the pipe relatively to the coupling (i.e., relative rotation of the pipe and coupling about the longitudinal axis of the pipe). Thus, valves or other items mounted on the pipe will tend to rotate. Use of an enlarged section to accommodate the annular ring may cause energy loss impeding fluid flow if the fluid is forced to flow into a coupling having a larger cross-sectional area. In general, when mechanical couplings are designed to overcome the aforementioned inherent disadvantages, they tend to suffer from a high part count, making them relatively complex and expensive.

SUMMARY AND OBJECTS OF THE INVENTION

The invention concerns a coupling for engaging a pipe end without the use of solder. The coupling comprises a first receptacle, preferably cylindrical in shape for receiving the pipe end, and a second receptacle, also preferably cylindrical, arranged coaxially and in tandem with the first receptacle. The second receptacle is smaller than the first receptacle so as to form a shoulder within the coupling between the first and second receptacles.

The coupling also includes a retainer having a perimetrical surface, preferably cylindrical and positioned within and coaxial with the first receptacle. Locking teeth are positioned circumferentially around the retainer and project from the perimetrical surface, the locking teeth being engageable with the first receptacle and the pipe end to resist removal of the pipe end from the coupling.

An elastomeric seal, for example an O-ring, is positioned coaxially within the first receptacle between the shoulder and the retainer and effects a fluid-tight seal between the pipe end and the first receptacle.

In the preferred embodiment of the invention, each of the locking teeth has a first edge facing toward the shoulder and a second edge positioned opposite thereto. Each of the locking teeth is resiliently angularly biased to position the first edges radially inwardly of the perimetrical surface of the retainer and the second edges radially outwardly thereof. The first edges are engageable with the pipe end to resist relative motion between the pipe end and the retainer in a direction away from the shoulder, and the second edges are engaged with the first receptacle for resisting relative motion between the retainer and the first receptacle in a direction away from the shoulder. The pipe end is insertable under the first edges in a direction toward the shoulder for insertion into the fitting.

A circumferential groove is preferably positioned within the first receptacle adjacent to the locking teeth. Each of the second edges is resiliently biased into engagement with the groove providing even greater resistance to motion of the retainer relative to the first receptacle in a direction away from the shoulder.

In an alternate embodiment, the retainer includes a first plurality of the teeth that are resiliently biased radially inwardly from the perimetrical surface of the retainer. The first plurality of teeth each have an edge facing toward the shoulder, each edge being engageable with the pipe end. The first plurality of teeth deflect resiliently radially outwardly to allow insertion of the pipe end coaxially into the coupling, the edges being resiliently biased into engagement with the pipe to resist relative movement between the pipe and the retainer in a direction away from the shoulder.

A second plurality of the teeth each have a first segment resiliently biased radially inwardly from the perimetrical surface and a second segment extending angularly from the first segment outwardly from the perimetrical surface. The first and second segments define an apex located between the segments, and each apex is engageable with the pipe end to support it upon its insertion coaxially into the coupling. Each second segment also has an edge facing away from the shoulder for engaging the first receptacle. The second plurality of teeth resiliently deflect radially inwardly to allow insertion of the retainer coaxially into the first receptacle. The edges on the second segments are resiliently biased into engagement with the first receptacle to resist relative movement between the retainer and the coupling in a direction away from the shoulder.

The retainer preferably has a first end facing the shoulder and a second end oppositely arranged. A first flange is positioned on the first end and extends radially inwardly from the perimetrical surface. Together, the first flange and the shoulder define a pocket for containing an elastomeric seal such as and O-ring. A second flange is positioned on the second end and extends radially outwardly from the perimetrical surface. The second flange engages the first receptacle and limits motion of the retainer into it.

To afford a more positive engagement between the teeth and the pipe end in both the preferred and alternate embodiments, a circumferential groove may be located along an outer surface of the pipe end and positioned for engagement with the edges of the teeth. The edges are resiliently biased into the groove upon engagement between the coupling and the pipe end and provide even greater resistance to motion of the pipe end relatively to the coupling in a direction away from the shoulder. A second circumferential groove is preferably located on the pipe end in spaced relation to the first groove. The second groove is positioned to align coaxially flush with an end of the retainer when the edges of the aforementioned teeth are engaged with the first groove, thus, giving a visual indication that the pipe end is properly engaged with the coupling.

Preferably, the standard copper fitting is chosen from among the ASTM standards but could also comprise DIN or BS standard fittings as well.

It is an object of the invention to provide a mechanical pipe coupling which does not require solder to effect a fluid-tight joint.

It is another object of the invention to provide a pipe coupling which can be readily formed from ASTM, DIN or BS standard fittings.

It is another object of the invention to provide a pipe coupling which is simple to make, simple to use and has a low part count.

It is still another object of the invention to provide a pipe coupling having a relatively high pull-out strength.

It is yet another object of the invention to provide a pipe coupling which helps to concentrically align the coupling and pipe upon insertion of the pipe end into the coupling.

It is again another object of the invention to provide a coupling which maintains good electrical conductivity across the joint.

It is yet again another object of the invention to provide a coupling which causes low energy loss to fluid flowing through it.

It is still again another object of the invention to provide a coupling which effectively resists axial rotation of the pipe relatively to the fitting.

These and other objects of the invention will become apparent from consideration of the following drawings and detailed description of preferred and alternate embodiments of the coupling according to the invention.

BRIEF DESCRIPTION OF THE DRAWINGS

FIG. 3 is a cross-sectional view on an enlarged scale of a portion of the coupling shown in FIG. 1;

FIG. 4 is a cross-sectional view on an enlarged scale of a portion of the coupling shown in FIG. 1;

FIG. 5 is an isometric view showing an assembled and an exploded view of an alternate embodiment of a coupling according to the invention;

FIG. 8 is a cross-sectional view on an enlarged scale of a portion of the coupling shown in FIG. 5; and FIG. 9 is a cross-sectional view on an enlarged scale of a portion of the coupling shown in FIG. 1.

DETAILED DESCRIPTION OF THE PREFERRED AND ALTERNATE EMBODIMENTS

Figure 1:
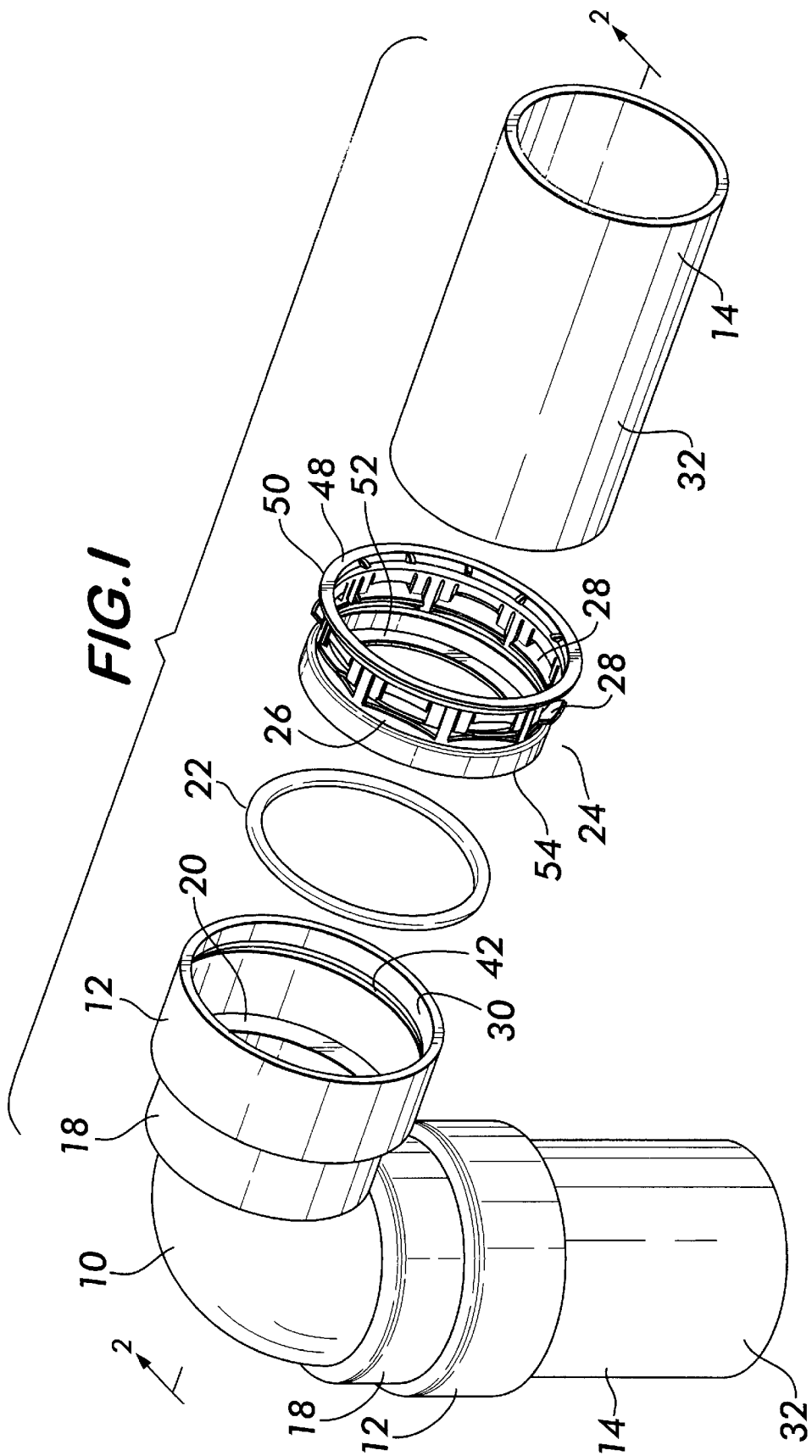
FIG. 1 is an perspective view showing an assembled and an exploded view of a coupling according to the invention.

FIG. 1 shows the preferred embodiment of a coupling 10 according to the invention. The coupling 10 is depicted as a 90° elbow by way of example, but could take any practical form such as a 45° elbow, a tee, a straight coupling, a portion attached to a valve for coupling to a pipe end and the like.

The coupling 10 has a first receptacle 12, preferably cylindrical in shape, for coaxially receiving a pipe end 14. A second receptacle 18 is arranged coaxially and in tandem with first receptacle 12. Second receptacle 18 is preferably tapered, for example, with a linear taper, or a frusto-conical taper, but may also be cylindrical. The taper is preferred to allow second receptacle 18 to receive pipe end 14 in an interference fit thereby providing frictional resistance against axial rotation between said pipe and the coupling 10. Second receptacle 18 is smaller than first receptacle 12 so as to form a shoulder 20 between the first and second receptacles 12 and 18.

Coupling 10 can be fabricated in any number of ways well known in the art, but it is preferred to start with an existing standard fitting, for example, an ASME/ANSI standard copper pipe fitting and enlarge an opening of the fitting over a first portion to form the first receptacle 12 while leaving a second portion of the fitting unenlarged so as to form the second receptacle 18 arranged coaxially and in tandem with the first receptacle 12, a shoulder 20 thereby being formed within the coupling between the first and second receptacles. The standard fitting is preferably enlarged by hydroforming methods but enlargement could also be effected by spin forming and die forming to cite examples. While the ASME/ANSI standard is preferred, other standard fittings, such as DIN or BS, could also be used. It should be understood that the coupling according to the invention is not limited for use only with standard copper fittings, but standard fittings are preferred because they are readily available, in widespread use, inexpensive and allow the invention to be adapted economically for immediate use.

As further shown in FIG. 1, when it is desired to effect a fluid tight sealing engagement between the pipe and the coupling an elastomeric seal 22 may be positioned coaxially within first receptacle 12 as described below. Seal 22 is preferably an O-ring to sealingly match the preferred cylindrical shape of first receptacle 12, but the seal 22 could also have other shapes, such as an octagon, depending upon the shape of the first receptacle 12.

Figure 1A:
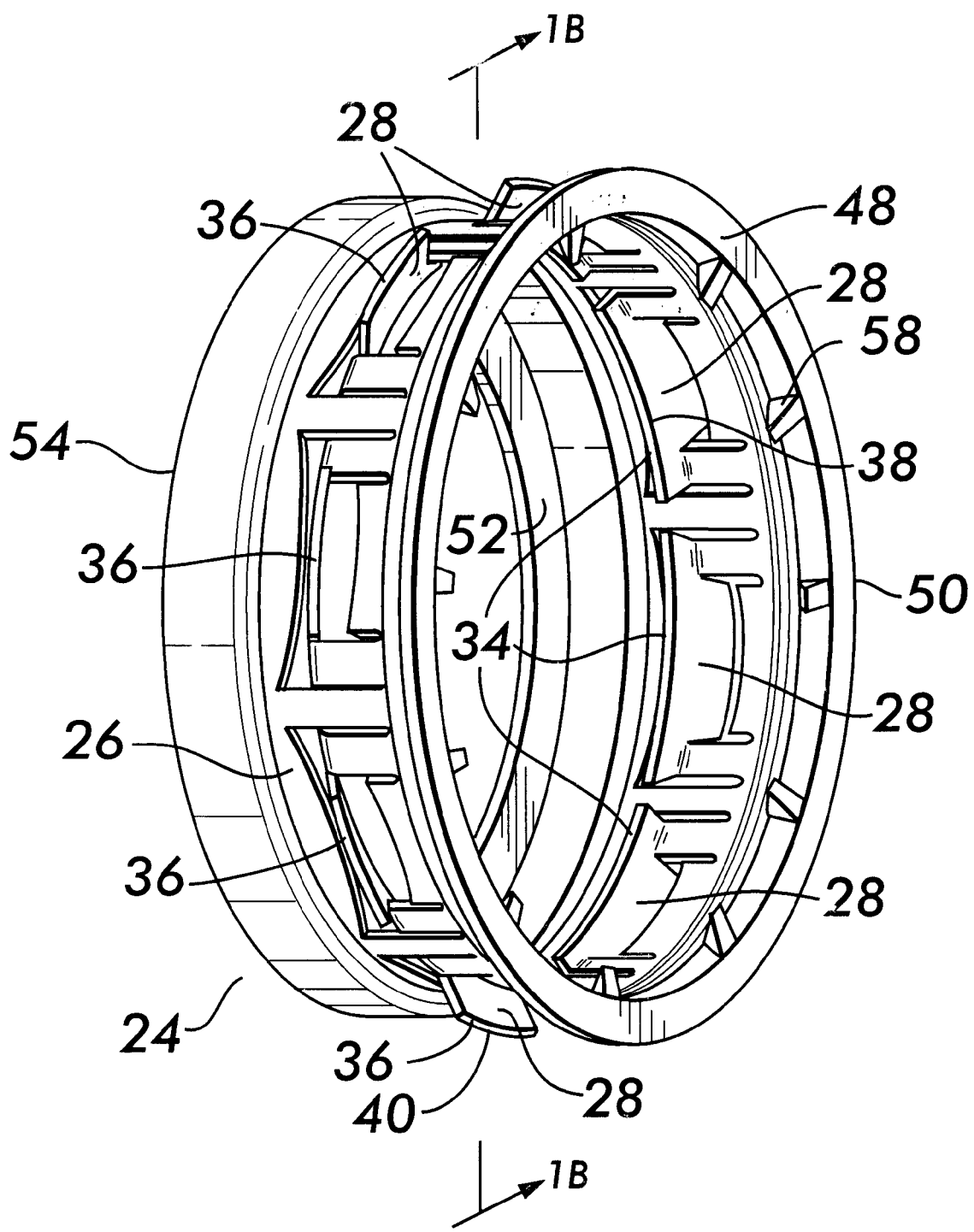
FIG. 1A is an perspective view on an enlarged scale of a preferred embodiment of a retainer shown in FIG. 1.
Figure 1B:
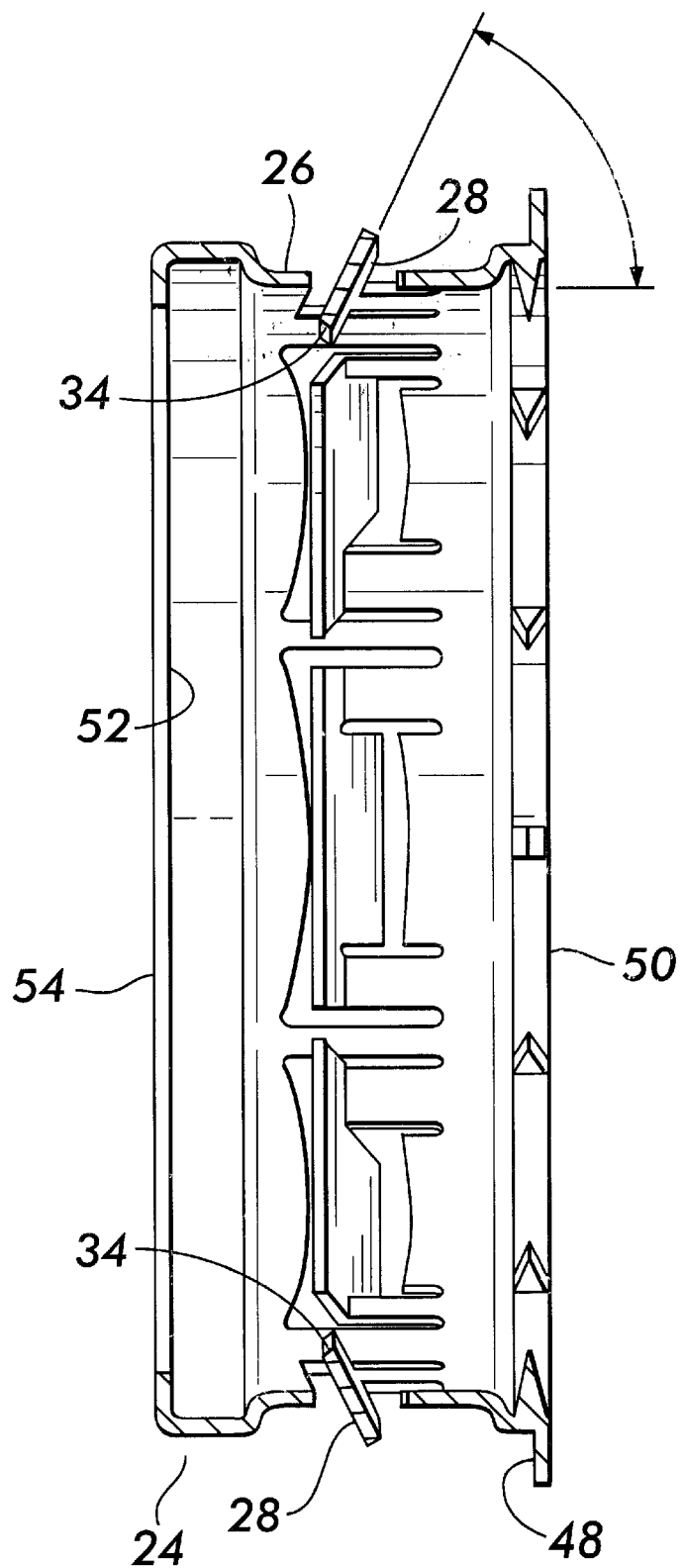
FIG. 1B is a cross sectional view taken along line 1B—1B of FIG. 1A.
Figure 2:
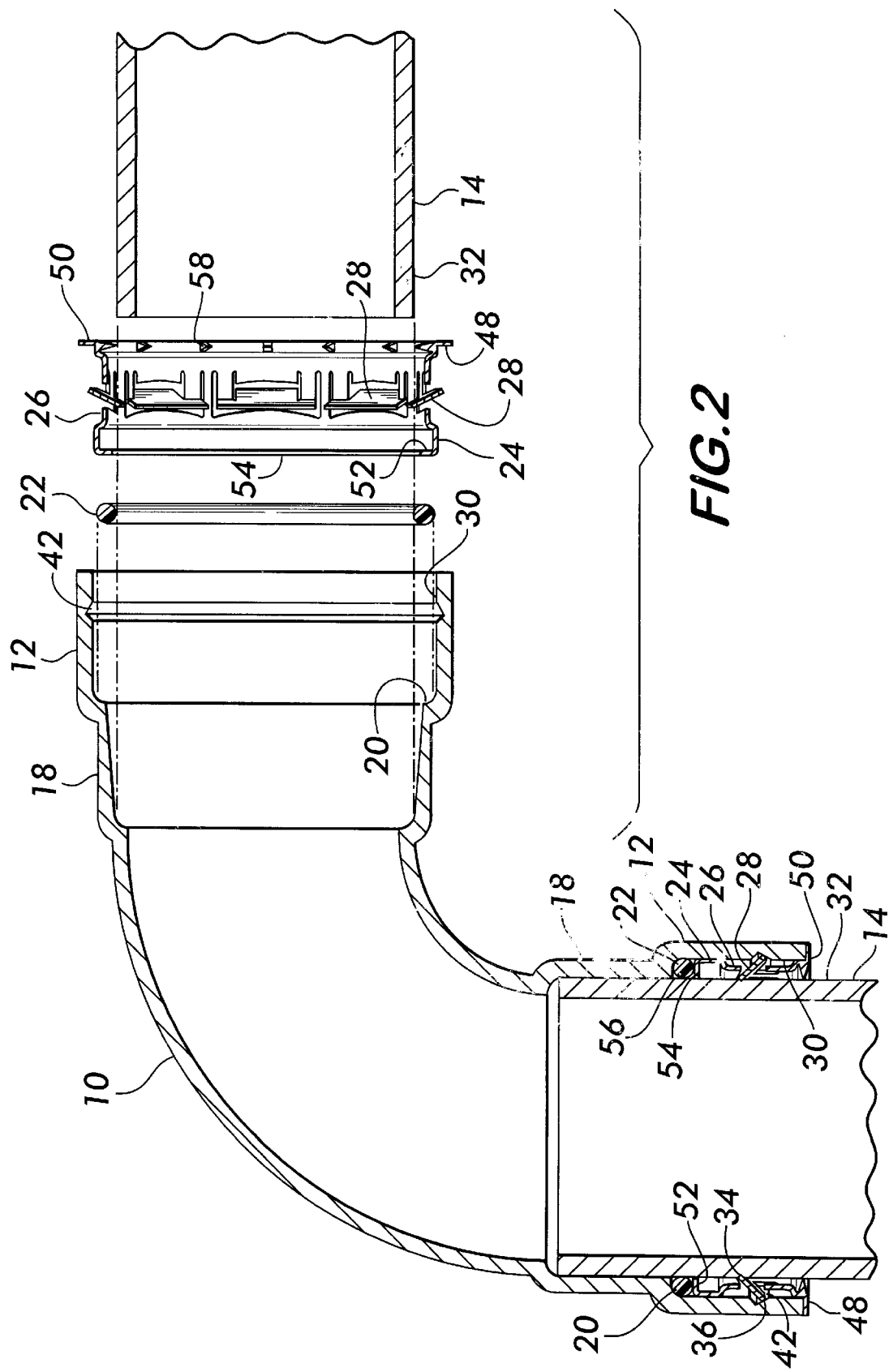
FIG. 2 is a cross-sectional view taken along line 2—2 of FIG. 1.

As shown in FIGS. 1 and 2 and in detail in FIGS. 1A and 1B a retainer 24 having a perimetrical surface 26 is positioned coaxially within the first receptacle 12 adjacent to elastomeric seal 22. A plurality of locking teeth 28 are positioned circumferentially around the perimetrical surface 26 and project radially therefrom. Preferably, the locking teeth 28 are resiliently biased to engage the inner surface 30 of first receptacle 12 and the outer surface 32 of pipe end 14 when the pipe end is inserted into receptacle 12 to effect a pipe joint connection as best seen in FIG. 2. Once the pipe end is engaged with the retainer, the locking teeth resist motion of the pipe relative to the retainer and motion of the retainer relative to the coupling to secure the pipe to the coupling, as described in detail below.

The preferred embodiment of the coupling 10 uses the retainer 24 shown in FIGS. 1A and 1B. Retainer 24 is preferably made of stainless steel to prevent corrosion and provide the required resilience and flexibility needed for the locking teeth. In the alternative, alloys of beryllium-copper are also feasible in view of their great resilience.

Retainer 24 has one set of locking teeth 28. Each of the locking teeth 28 has a first edge 34 facing obliquely toward shoulder 20 and a second edge 36 oppositely positioned. Preferably, teeth 28 are aligned in a row around the retainer as shown in FIG.1A. As shown in FIG.1B, each of the teeth are angularly biased relatively to the perimetrical surface 26 of the retainer to position first edges 34 radially inwardly of surface 26 and the second edges 36 radially outwardly thereof. As best shown in FIG. 2, the first edges are engageable with outer surface 32 of pipe end 14 to resist motion of the pipe end relatively to the retainer in a direction away from the shoulder 20. Second edges 36 are engageable with inner surface 30 of first receptacle 12 and resist motion of the retainer 24 relatively to coupling 10 in a direction away from the shoulder 20. The teeth are resiliently biased in order to flexibly deform to allow the retainer to be inserted into the coupling and the pipe to be inserted into the retainer within the coupling, but the teeth are self-jamming between the inner surface 30 and outer surface 32 to resist motion of the pipe end away from the shoulder 20.

To improve engagement between the teeth 28 and the pipe end and the coupling, first edges 34 may be given a concave shape 38 (see FIG. 1A) matched to the curvature of outer pipe surface 32 while second edges 36 may be given a convex shape 40 matched to the curvature of inner surface 30. To further improve the engagement, a circumferential groove 42, best shown in FIG. 2, may be positioned within cylindrical first receptacle 12 adjacent to teeth 28 to receive second edges 36 which are resiliently biased into the groove.

To enhance the locking effect of the teeth 28, a circumferential groove 68 may be positioned in the pipe end 14. As shown in FIGS. 3 and 4, teeth 28 are resiliently biasable into groove 68, the edges 34 engaging the groove and resisting motion of the pipe end relatively to the retainer 24 away from the shoulder 20.

As shown in FIGS. 3 and 4, groove 42 is preferably formed with a first surface 44 positioned proximate to shoulder 20 and a second surface 46 positioned distally from the shoulder. To reduce the insertion force required to insert pipe end 14 into receptacle 12, the second surface 46 is oriented at a shallower angle than the first surface 44 relatively to the retainer perimetrical surface 26. This allows the teeth to easily move out of the groove 42 (see FIG. 3) as the teeth 28 resiliently deflect upon insertion of the pipe, but the teeth will still engage the groove, as seen in FIG. 4, to prevent pullout of the retainer from the fitting.

To aid in the proper positioning of retainer 24 within cylindrical first receptacle 12, a flange 48 (see FIGS. 2 and 4) is positioned at end 50 of the retainer. Preferably, flange 48 comprises a circumferentially continuous annulus extending radially outwardly from the retainer perimetrical surface 26 to engage the cylindrical first receptacle 12 and prevent the retainer from being inserted too far into the coupling.

As shown in FIGS. 3 and 4, a second groove 96 may also be positioned in pipe end 14 in spaced relation to the end to provide a visual indication that the pipe end is properly engaged with the coupling. The second groove 96 is located along the pipe end so that it will be visibly flush with the end 50 of the retainer 24 in the first receptacle 12 when the pipe end is properly engaged with the coupling.

As shown in FIG. 4, retainer 24 has a second flange 52 arranged at its other end 54. Flange 52 is preferably a circumferentially continuous annulus which extends radially inwardly from the retainer perimetrical surface 26, and, together with shoulder 20 and surface 30 forms a pocket 56 for containing elastomeric seal 22. The elastomeric seal is radially compressible between pipe outer surface 32 and inner surface 30 of receptacle 12, as well as axially compressible between flange 52 and shoulder 20 to effect a fluid-tight seal between the coupling and the pipe end.

To effect a fluid-tight joint according to the invention, the elastomeric seal 22 and retainer 24 are inserted into the enlarged first receptacle 12 of coupling 10 and the pipe end 14 is coaxially inserted as shown in FIGS. 1 and 2. It is important that the pipe end be inserted fully into the coupling so that it engages the second receptacle 18. This receptacle is preferably tapered to ensure positive contact between the pipe end and the coupling for support and alignment of the pipe end, to provide electrical continuity across the pipe joint, and to provide an interference fit with significant friction so as to prevent relative axial rotation of the pipe and fitting.

To provide support for the pipe end 14 upon insertion into retainer 24, a plurality of projections 58 (see FIGS. 1A and 4) may be formed adjacent to flange 48 proximate to retainer end 50. Projections 58 provide support along with first edges 34 of teeth 28 to guide pipe end 14 coaxially into the retainer and the coupling to prevent the pipe end from tipping and possibly gouging the elastomeric seal 22 or second receptacle 18.

Figure 7:
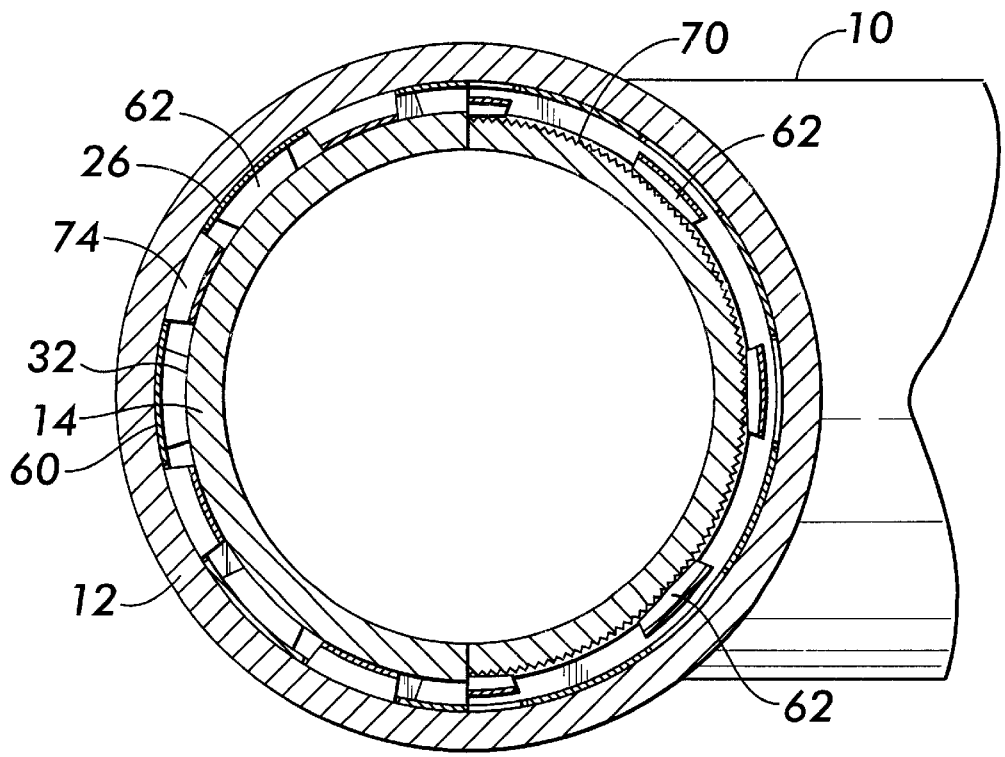
FIG. 7 is a cross-sectional view taken along line 7—7 of FIG. 6.
Figure 5B:
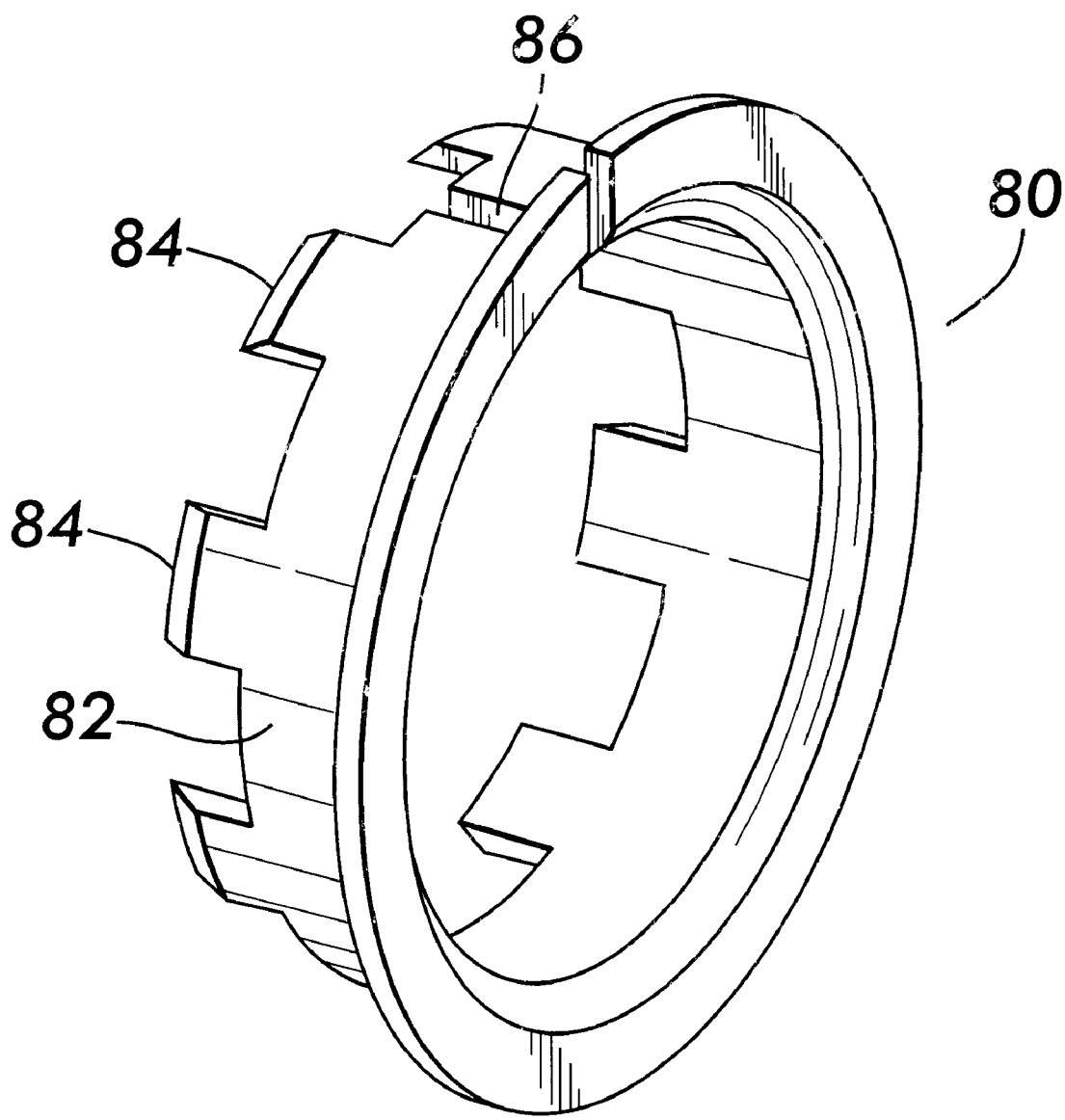
FIG. 5B is a perspective view of a release tool according to the invention.

In an alternate embodiment of the coupling according to the invention shown in FIGS. 5–9, an alternate retainer 60 is used. On retainer 60, the locking teeth 28 comprise a first plurality of teeth 62 resiliently biased radially inwardly from the retainer perimetrical surface 26 as shown in FIGS. 5A and 7. The teeth 62 are preferably arranged adjacent to one end 64 of the retainer 60 at equally spaced intervals circumferentially around the retainer. Each tooth 62 has an edge 66 facing obliquely towards shoulder 20 (see FIG. 5). Being resiliently biased, teeth 62 deflect outwardly when they contact the outer surface 32 of pipe end 14 when it is inserted coaxially into the retainer 60 toward shoulder 20 as shown in detail in FIG. 8. However, due to the oblique angle at which the teeth are oriented the edges 66 will bite into outer surface 32 and resist motion of the pipe end away from the shoulder 20.

To enhance the locking effect of the teeth 62, a circumferential groove 68 may be positioned in the pipe end. As shown in FIGS. 6 and 9, teeth 62 are resiliently biased into groove 68, the edges 66 engaging the groove and resisting motion of the pipe end relatively to the retainer away from the shoulder 20. The surface of groove 68 may have serrations 70 (see FIGS. 5 and 7) which engage projections 72 extending from teeth 62 (shown in FIG. 5A) to provide resistance to axial rotation between the pipe end 14 and retainer 60.

Figure 5A:
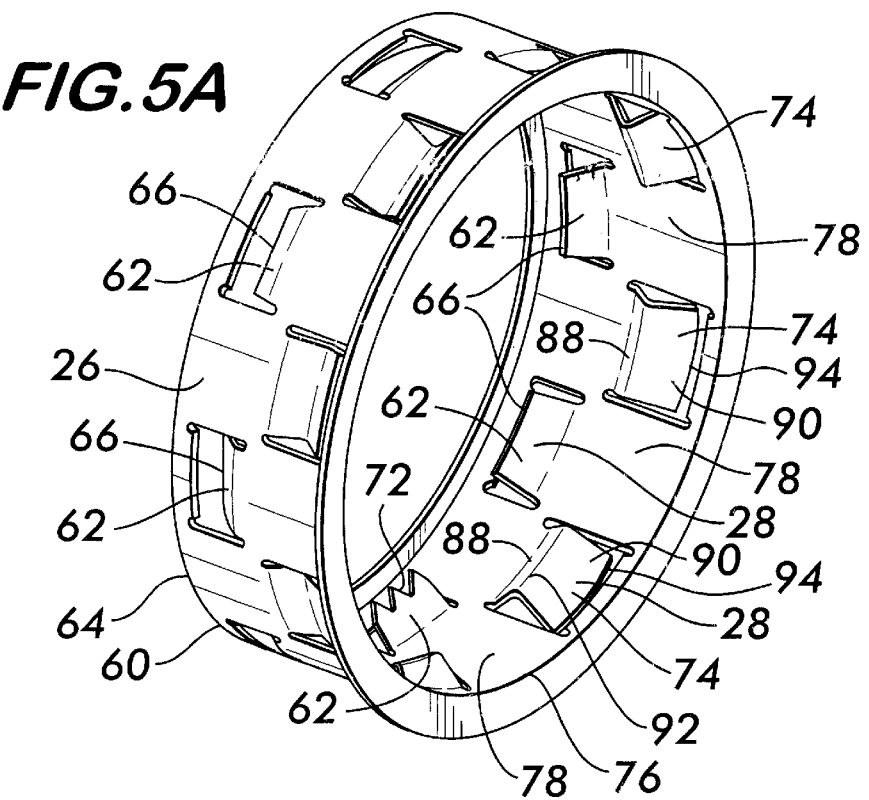
FIG. 5A is an perspective view on an enlarged scale of an alternate embodiment of a retainer shown in FIG. 5.
Figure 6:
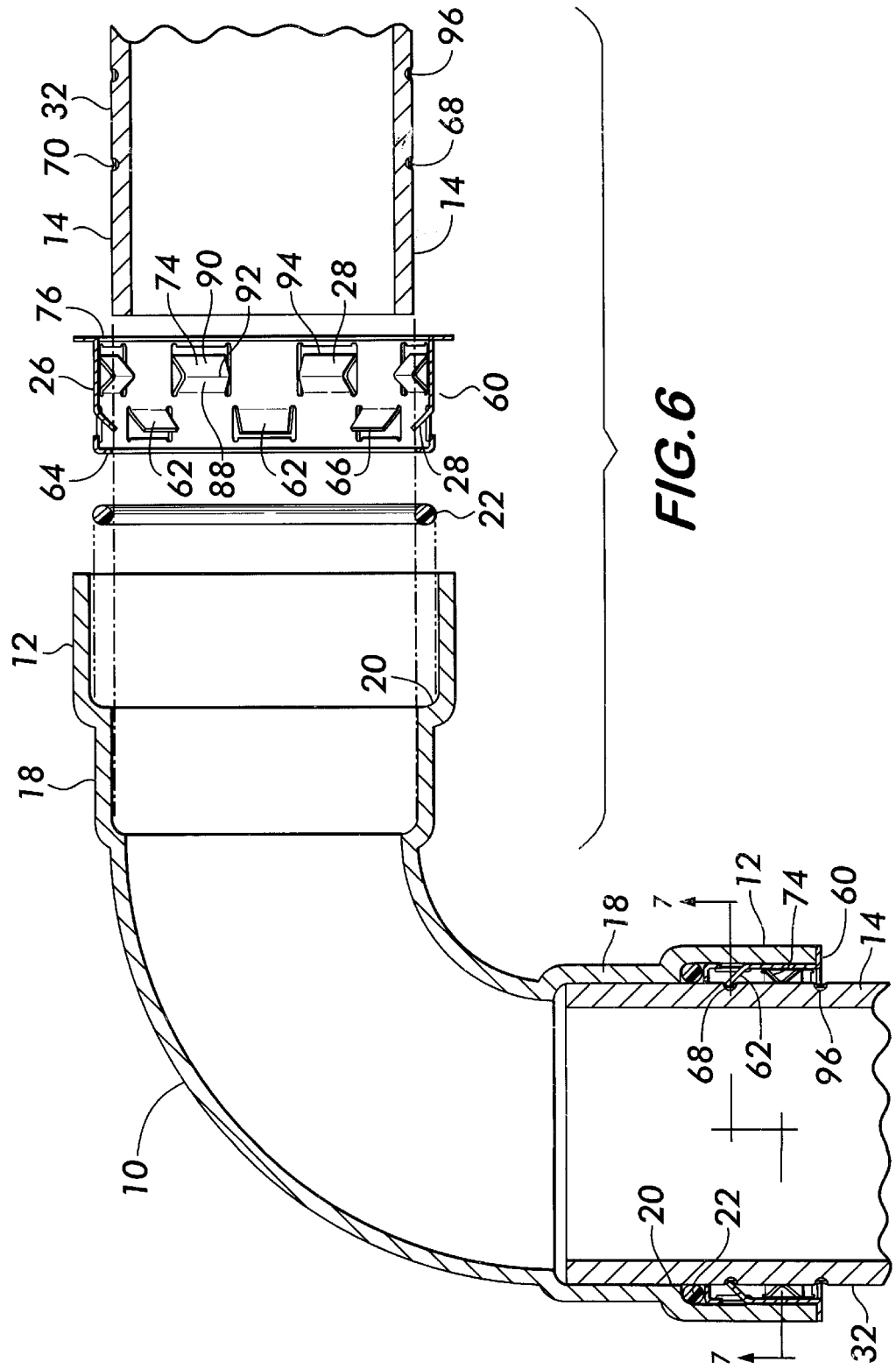
FIG. 6 is a cross-sectional view taken along line 6—6 of FIG. 5.

As further shown in FIGS. 5 and 5A, the alternate embodiment has a second plurality of teeth 74, preferably arranged in equally spaced intervals circumferentially around the retainer 60 adjacent to an end 76 of the retainer opposite to end 64. The perimetrical surface 26 of retainer 60 forms a plurality of spaces 78 arranged circumferentially around the retainer, each tooth 74 of the second plurality being positioned between two of the spaces 78, and each tooth 62 comprising the first plurality of teeth being axially aligned with one of the spaces. Thus, the teeth and spaces on the retainer are arranged in a checkerboard pattern as best shown in FIG. 5A.

By providing spaces 78 between teeth 74 and aligning each tooth 62 with a space 78, a release tool 80 (see FIG. 5B) may be used to effect the release of pipe end 14 from retainer 60. Release tool 80 has a surface 82 which is coaxially insertable between the retainer 60 and the outer surface 32 of the pipe end 14. A plurality of projections 84 extend axially from one end of the tool. Projections 84 are circumferentially spaced around the tool to pass within spaces 78 (thereby missing teeth 74) and align with teeth 62, there being one projection for each tooth. To effect release of the pipe end 14, projections 84 are axially aligned with teeth 62 and the tool is inserted between the pipe end and the retainer. The projections 84 pass between teeth 74 and engage teeth 62, forcing these teeth radially outwardly out of engagement with the pipe end allowing the pipe end to be withdrawn from the coupling 10. Preferably, the release tool 80 is made of a flexible plastic material and has a split 86 allowing the tool to be opened and placed around a pipe having no free end.

As best shown in FIGS. 5A and 6, teeth 74 each have a first segment 88 resiliently biased radially inwardly from the surface 26 of retainer 60. A second segment 90 extends angularly from the first segment outwardly from the surface defining an apex 92 between the segments. As shown in FIGS. 8 and 9 apexes 92 engage the outer surface 32 of pipe end 14 and support the pipe end upon its insertion coaxially into the coupling. Together, apexes 92 of teeth 74 and edges 66 of teeth 62 provide extended lengthwise support of the pipe end to keep it concentric within the coupling and prevent the pipe end from tipping and possibly gouging the retainer, the fitting or the elastomeric seal 22 as the pipe end is inserted into the coupling.

As further shown in FIGS. 5A and 6, each of the second segments 90 has an edge 94 facing obliquely away from shoulder 24 for engaging inner surface 30 of the first receptacle 12. Teeth 74 deflect resiliently inwardly as retainer 24 is inserted into first receptacle 12, but, by virtue of their resilient outward biasing and their oblique angle, the edges 94 bite into the inner surface 30 to resist motion of the retainer relative to the first receptacle 12 in a direction away from the shoulder 24 as illustrated in FIG. 9. The engagement force between edges 94 and inner surface 30 is increased when pipe end 14 is inserted coaxially within retainer 24 because the apexes 92 are forced outwardly by their contact with outer surface 32 as seen in FIGS. 8 and 9. Thus, insertion of the pipe end helps to increase the pull-out strength of the retainer out of the coupling by increasing the force of the engagement between the edges 92 and the inner surface 30.

As shown in FIGS. 8 and 9 a second groove 96 may be positioned in pipe end 14 in spaced relation to the end to provide a visual indication that the pipe end is properly engaged with the coupling. The second groove 96 is located along the pipe end so that it will be visibly flush with the end 76 of the retainer 60 in first receptacle 12 when the pipe end is properly engaged. As shown in FIGS. 8 and 9, the visual indication provided by the second groove is especially convenient when the second groove 96 is located in spaced relation to first groove 68 to align flush with retainer end 76 when edges 66 of teeth 62 are engaged with first groove 68. The second groove also serves to indicate that pipe end 14 is fully and properly engaged with tapered second receptacle 18 to provide all of the aforementioned advantages of this engagement.

The coupling according to the invention may be readily adapted for use with existing standard fittings to form pipe joints which are fluid-tight and have adequate mechanical strength without the need for soldering, thus, avoiding the costs and hazards associated with traditional soldered joints. The invention also provides advantages over prior art mechanical systems for joining pipes and provides a coupling which is inexpensive, simple and reliable.

What is claimed is:

1. A coupling for engaging a pipe end, said coupling comprising:
   a first cylindrical receptacle for receiving said pipe end;
   a second receptacle arranged coaxially and in tandem with said first receptacle, said second receptacle being smaller than said first receptacle so as to form a shoulder within said coupling between said first and second receptacles, said second receptacle being tapered, becoming smaller in a direction away from said shoulder, said taper being sized to receive said pipe end in an interference fit thereby providing frictional resistance against axial rotation between said pipe and said coupling;
   a retainer having a cylindrical perimetrical surface positioned within and coaxial with said first receptacle, said retainer having locking teeth positioned circumferentially around and projecting from said surface, said locking teeth being engageable with said first receptacle and said pipe end resisting removal of said pipe end from said coupling.

2. A coupling according to claim 1, further comprising an elastomeric seal positioned coaxially within said first receptacle between said shoulder and said retainer and effecting a fluid-tight seal between said pipe end and said first receptacle.

3. A coupling according to claim 2, wherein said elastomeric seal comprises an O-ring.

4. A coupling according to claim 2, wherein said retainer has a first end facing said shoulder and a second end oppositely arranged, a first flange being positioned on said first end and extending radially inwardly from said cylindrical surface, said first flange and said shoulder defining a pocket for containing said elastomeric seal, a second flange positioned on said second end and extending radially outwardly from said cylindrical surface, said second flange engaging said first receptacle and limiting motion of said retainer into said first receptacle.

5. A coupling according to claim 4, wherein at least one of said first and second flanges comprises a circumferentially continuous annulus.

6. A coupling according to claim 2, wherein said elastomeric seal is elastically radially compressible between said pipe and said first receptacle thereby effecting a fluid-tight seal therebetween.

7. A coupling according to claim 1, wherein said teeth comprise a first plurality of said teeth being resiliently biased radially inwardly from said surface, said first plurality of teeth each having an edge facing toward said shoulder and engageable with said pipe end, said first plurality of teeth deflecting resiliently radially outwardly to allow insertion of said pipe end coaxially into said coupling, said edges being resiliently biased into engagement with said pipe to resist relative movement between said pipe and said coupling in a direction away from said shoulder.

8. A coupling according to claim 7, wherein said edges of said teeth face obliquely toward said shoulder.

9. A coupling according to claim 7, wherein said teeth further comprise a second plurality of said teeth, each having a first segment resiliently biased radially inwardly from said surface, and a second segment extending angularly from said first segment outwardly from said surface and defining an apex between said segments, each said apex being engageable with and supporting said pipe end upon its insertion coaxially into said coupling, each said second segment having an edge facing away from said shoulder and engaging said first receptacle, said second plurality of teeth resiliently deflecting radially inwardly to allow insertion of said retainer coaxially into said coupling, said edges on said second segments being resiliently biased into engagement with said first receptacle to resist relative movement between said retainer and said coupling in a direction away from said shoulder.

10. A coupling according to claim 9, wherein said first plurality of teeth are positioned adjacent to one end of said retainer and said second plurality of teeth are positioned adjacent to an opposite end of said retainer.

11. A coupling according to claim 10, wherein said perimetrical surface comprises a plurality of spaces arranged circumferentially around said retainer, each tooth of said second plurality of teeth being positioned between two of said spaces.

12. A coupling according to claim 11, wherein each tooth of said first plurality of teeth is axially aligned with one of said spaces.

13. A coupling according to claim 12, wherein said first and second plurality of teeth are arranged in circumferentially equally spaced intervals around said retainer.

14. A coupling according to claim 12, further comprising a release tool having a surface coaxially insertable between said retainer and said first receptacle, said tool having a plurality of projections positioned at one end and extending axially therefrom, said projections being circumferentially spaced around said tool and alignable to engage said first plurality of teeth and force said each tooth of said first plurality of teeth radially outwardly out of engagement with said pipe end upon insertion of said tool between said retainer and said first receptacle to effect release of said pipe end from said fitting.

15. A coupling according to claim 7, wherein a circumferential groove is located along an outer surface of said pipe end, said coupling further comprising said edges of said first plurality of teeth being resiliently biasable into said groove upon engagement of said coupling with said pipe end for resisting motion of said pipe end relatively to said coupling in a direction away from said shoulder.

16. A coupling according to claim 15, wherein said circumferential groove has a serrated surface, said coupling further comprising at least one of said teeth having a projection engagable with said serrations for resisting axial rotation between said pipe end and said retainer.

17. A coupling according to claim 15, wherein a second circumferential groove is located on said pipe end in spaced relation relatively to said first groove, said coupling further comprising an end of said retainer coaxially alignable flush with said second groove when said edges of said first plurality of teeth are engaged with said first groove.

18. A coupling according to claim 1, wherein said coupling comprises a copper pipe fitting compatible with Standard B16.22a-1998 and having at least one end expanded in diameter to form said first receptacle.

19. A coupling according to claim 1, wherein each of said locking teeth has a first edge facing toward said shoulder and a second edge positioned opposite thereto, each of said locking teeth being resiliently angularly biased to position said first edges radially inwardly of said perimetrical surface and said second edges radially outwardly thereof, said first edges being engageable with said pipe end to resist relative motion between said pipe end and said retainer in a direction away from said shoulder, said second edges being engaged with said first receptacle resisting relative motion between said retainer and said first receptacle in a direction away from said shoulder, said pipe end being insertable under said first edges in a direction toward said shoulder for insertion into said coupling.

20. A coupling according to claim 19, wherein said first receptacle and said retainer are cylindrical and at least one of said first edges has a concave shape and at least one of said second edges has a convex shape.

21. A coupling according to claim 19, wherein said locking teeth are aligned in a row.

22. A coupling according to claim 21, further comprising a circumferential groove positioned within said first receptacle adjacent to said locking teeth, each of said second edges being resiliently biased into engagement with said groove resisting motion of said retainer relative to said first receptacle in a direction away from said shoulder.

23. A coupling according to claim 22, wherein said groove has a first surface positioned proximally to said shoulder and a second surface positioned distally to said shoulder, said second surface being oriented at a shallower angle than said first surface relatively to said retainer cylindrical surface.

24. A coupling according to claim 21, wherein a circumferential groove is located along an outer surface of said pipe end, said coupling further comprising said first edges being resiliently biasable into engagement with said groove for resisting motion of said pipe end relatively to said coupling in a direction away from said shoulder.

25. A coupling according to claim 24, wherein a second circumferential groove is located on said pipe end in spaced relation to said first groove, said coupling further comprising an end of said retainer coaxially alignable flush with said second groove when said first edges are engaged with said first groove.

26. A coupling for sealingly engaging a pipe end, said coupling comprising:

a first receptacle for receiving said pipe end;

a second receptacle arranged coaxially and in tandem with said first receptacle, said second receptacle being smaller than said first receptacle so as to form a shoulder within said coupling between said first and second receptacles;

a retainer having a cylindrical surface for positioning within and coaxial with said first receptacle, said retainer comprising:

a first plurality of locking teeth positioned circumferentially around and being resiliently biased radially inwardly from said perimetrical surface, said first plurality of teeth each having an edge facing obliquely toward said shoulder and engageable with said pipe end, said first plurality of teeth deflecting resiliently radially outwardly to allow insertion of said pipe end coaxially into said coupling, said edges being resiliently biased into engagement with said pipe to resist relative movement between said pipe and said coupling in a direction away from said shoulder;

a second plurality of locking teeth positioned circumferentially around said perimetrical surface, said second plurality of teeth each having an edge facing away from said shoulder and resiliently biased outwardly from said perimetrical surface for engagement with said first receptacle to resist relative movement between said retainer and said coupling in a direction away from said shoulder; and an elastomeric seal positioned coaxially within said first receptacle between said shoulder and said retainer and effecting a fluid-tight seal between said pipe end and said first receptacle.

27. A coupling according to claim 26, wherein each of said second locking teeth comprises a first segment resiliently biased radially inwardly from said perimetrical surface, and a second segment extending angularly from said first segment outwardly from said perimetrical surface and defining an apex between said segments, each said apex being engageable with and supporting said pipe end upon its insertion coaxially into said coupling, each said edge of said second locking teeth being positioned on a respective second segment.

28. A coupling according to claim 27, wherein said first plurality of teeth are positioned adjacent to one end of said retainer and said second plurality of teeth are positioned adjacent to an opposite end of said retainer.

29. A coupling according to claim 28, a second circumferential groove is located on said pipe end in spaced relation to said first groove, said coupling further comprising an end of said retainer coaxially alignable flush with said second groove when said edges of said first plurality of teeth are engaged with said first groove.

30. A coupling according to claim 27, wherein a circumferential groove is located along an outer surface of said pipe end, said coupling further comprising said edges of said first plurality of teeth being resiliently biasable into said groove upon engagement of said pipe coupling with said pipe end for resisting motion of said pipe end relatively to said coupling in a direction away from said shoulder.

31. A coupling according to claim 26, wherein said second receptacle is tapered, said taper being sized to receive and support said pipe end with an interference fit.

32. A coupling according to claim 26, wherein said coupling comprises a copper pipe fitting compatible with Standard B16.22a-1998 and having a nominal size selected from the group consisting of ½ inch, ¾ inch, 1 inch, 1.25 inch, 1.5 inch and 2 inch, said fitting having at least one end expanded in diameter to form said first receptacle.

33. A coupling according to claim 26, wherein said coupling comprises a fitting compatible with European Standard EN 1254 and having a nominal size selected from the group consisting of 15 mm, 22 mm, 28 mm, 35 mm, 42 mm and 54 mm, said fitting having at least one end expanded in diameter to form said first receptacle.

34. A coupling for sealingly engaging a pipe end, said coupling comprising:

a first receptacle for receiving said pipe end;

a second receptacle arranged coaxially and in tandem with said first receptacle, said second receptacle being smaller than said first receptacle so as to form a shoulder within said coupling between said first and second receptacles;

a retainer having a perimetrical surface for positioning within and coaxial with said first receptacle, said retainer having locking teeth positioned circumferentially around and projecting from said perimetrical surface, each of said locking teeth having a first edge facing obliquely toward said shoulder and a second edge positioned opposite thereto, each of said locking teeth being resiliently angularly biased for positioning said first edges radially inwardly of said perimetrical surface and said second edges radially outwardly thereof, said first edges being engageable with said pipe end to resist relative motion between said pipe end and said retainer in a direction away from said shoulder, said second edges being engageable with said first receptacle resisting relative motion between said retainer and said first receptacle in a direction away from said shoulder, said pipe end being insertable under said first edges in a direction toward said shoulder for insertion into said fitting; and an elastomeric seal positioned coaxially within said first receptacle between said shoulder and said retainer and effecting a fluid-tight seal between said pipe end and said first receptacle.

35. A coupling according to claim 34, wherein at least one of said first edges has a concave shape and at least one of said second edges has a convex shape.

36. A coupling according to claim 35, further comprising a circumferential groove positioned within said first receptacle adjacent to said locking teeth, each of said second edges being resiliently biased into engagement with said groove resisting motion of said retainer relative to said first receptacle in a direction away from said shoulder.

* * * * *